United States Patent
Li et al.

(10) Patent No.: US 11,210,071 B2
(45) Date of Patent: Dec. 28, 2021

(54) COMPILER SUB EXPRESSION DIRECTED ACYCLIC GRAPH (DAG) REMAT FOR REGISTER PRESSURE

(71) Applicant: Microsoft Technology Licensing, LLC, Redmond, WA (US)

(72) Inventors: Xiang Li, Bellevue, WA (US); David McCarthy Peixotto, Seattle, WA (US); Michael Alan Dougherty, Issaquah, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 80 days.

(21) Appl. No.: 16/837,590

(22) Filed: Apr. 1, 2020

(65) Prior Publication Data

US 2021/0311708 A1 Oct. 7, 2021

(51) Int. Cl.
*G06F 8/41* (2018.01)
*G06F 16/901* (2019.01)

(52) U.S. Cl.
CPC .......... *G06F 8/433* (2013.01); *G06F 16/9024* (2019.01)

(58) Field of Classification Search
CPC ............................. G06F 8/433; G06F 16/9024
See application file for complete search history.

(56) References Cited

U.S. PATENT DOCUMENTS

| | | | |
|---|---|---|---|
| 4,571,678 A | 2/1986 | Chaitin | |
| 6,182,284 B1* | 1/2001 | Sreedhar | G06F 8/433 717/146 |
| 8,141,062 B2 | 3/2012 | Baev et al. | |
| 8,555,267 B2 | 10/2013 | Makarov | |
| 9,436,447 B2 | 9/2016 | Kong et al. | |
| 9,582,255 B1* | 2/2017 | Perron | G06F 9/30098 |
| 2002/0129343 A1* | 9/2002 | Pinter | G06F 8/434 717/140 |

(Continued)

OTHER PUBLICATIONS

Ivan D. Baev et al., "Prematerialization: Reducing Register Pressure for Free", [Online], pp. 285-294, [Retrieved from Internet on Aug. 6, 2021], <https://dl.acm.org/doi/pdf/10.1145/1152154.1152197>, (Year: 2006).*

(Continued)

*Primary Examiner* — Ziaul A Chowdhury
(74) *Attorney, Agent, or Firm* — Ray Quinney & Nebeker; Tiffany Healy

(57) ABSTRACT

The present disclosure relates to devices and methods for transforming program source code using a rematerialization operation. The devices and methods may identify at least one hot spot with high register pressure in a program source code for an application and identify a plurality of live variables within the at least one hot spot. The devices and methods may group the plurality of live variables by a basic block that has contained a define or single use of the plurality of live variables. The devices and methods may build a directed acyclic graph (DAG) for each basic block that has a grouped plurality of live variables. The devices and methods may save the DAG as a candidate instruction to move in the program source code and may generate transformed program source code for the application by moving the candidate instruction.

19 Claims, 7 Drawing Sheets

(56) References Cited

U.S. PATENT DOCUMENTS

| | | | |
|---|---|---|---|
| 2004/0154006 A1* | 8/2004 | Heishi | G06F 8/4432 |
| | | | 717/140 |
| 2005/0034111 A1* | 2/2005 | Martin | G06F 8/4452 |
| | | | 717/141 |
| 2010/0199270 A1 | 8/2010 | Baev | |
| 2011/0219364 A1* | 9/2011 | Makarov | 717/151 |
| 2013/0117734 A1 | 5/2013 | Kong et al. | |

OTHER PUBLICATIONS

Mouad Bahi et al., "Rematerialization-based register allocation through reverse computing", [Online], pp. 1-2, [Retrieved from Internet on Aug. 6, 2021], <https://dl.acm.org/doi/pdf/10.1145/2016604.2016632>, (Year: 2011).*

Cindy Norris et al., "Understanding and Improving Register Assignment", [Online], pp. 1255-1259, [Retrieved from Internet on Aug. 6, 2021], <https://link.springer.com/content/pdf/10.1007/3-540-48311-X_178.pdf>, (Year: 1999).*

Prashant Singh Rawat et al., "Register Optimizations for Stencils on GPUs", [Online], pp. 168-182, [Retrieved from Internet on Aug. 6, 2021], <https://dl.acm.org/doi/pdf/10.1145/3178487.3178500>, (Year: 2018).*

Andersson, Max, "Investigating Different Register Allocation Techniques for a GPU Compiler", In Master's Thesis Submitted to Department of Computer Science, Lund University, Jun. 22, 2016, 60 Pages.

Baev, et al., "Prematerialization: Reducing register pressure for free", In Proceedings of the International Conference an Parallel Architectures and Compilation Techniques, Sep. 16, 2006, pp. 285-294.

Baev, Ivan D, "Techniques for Region-Based Register Allocation", In Proceedings of the International Symposium on Code Generation and Optimization, Mar. 22, 2009, pp. 147-156.

"Module 31—DAG Construction, Reordering and Labeling", https://web.archive.org/web/20180921130420if_/http://epgp.inflibnet.ac.in:80/epgpdata/uploads/epgp_content/S000007CS/P001069/M020248/ET/1495621792Module31_Content_final.pdf, Sep. 21, 2018, 7 Pages.

"International Search Report and Written Opinion Issued in PCT Application No. PCT/US2021/017155", dated Jul. 8, 2021, 14 Pages.

Tip, Frank, "A Survey of Program Slicing Techniques", In Journal of Programming Languages, vol. 3, No. 3, Sep. 1, 1995, pp. 121-189.

* cited by examiner

302 {
```
float foo(float a, float b) {
    float c = a + b;
    float d = a * b;
    float e = sin(a);
    float f = cos(b);
```
}

304 {
```
    if (a > 0) {
        ...  // register pressure
             is high
             // c, d, e, f not used
             in if
    }
```
}

306 {
```
    float x = ...
    return c+d+e+f + x;
}
```
}

308 →

310 {
```
float foo(float a, float b) {
    if (a > 0) {
```
}

312 {
```
        ...
    }
    float x = ...
```
}

314 {
```
    float c = a + b;
    float d = a * b;
    float e = sin(a);
    float f = cos(b);
    return c+d+e+f;
}
```
}

COMPILER SUB EXPRESSION DIRECTED ACYCLIC GRAPH (DAG) REMAT FOR REGISTER PRESSURE

BACKGROUND

The balance between register pressure and instruction latency in program source code is key to graphics performance. High register pressure may cause delays or otherwise impact graphics performance. However, identifying expressions in program source code to save register pressure may be difficult. Thus, there is a need in the art for improvements in reducing register pressure in program source code for applications.

The subject matter claimed herein is not limited to implementations that solve any disadvantages or that operate only in environments such as those described above. Rather, this background is only provided to illustrate one exemplary technology area where some implementations described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a computer device. The computer device may include a memory to store data and instructions; at least one processor operable to communicate with the memory; and a compiler in communication with the memory and the at least one processor, wherein the compiler is operable to: identify at least one hot spot with high register pressure in a program source code for an application; identify a plurality of live variables within the at least one hot spot; group the plurality of live variables by a basic block that contains a define or single use of the plurality of live variables; for each basic block that has a grouped plurality of live variables, build a directed acyclic graph (DAG) for the grouped plurality of live variables; save the DAG as a candidate instruction to move in the program source code; and generate transformed program source code for the application by moving the candidate instruction in response to a total savings of the candidate instruction reaching a target register pressure for the program source code.

Another example implementation relates to a method. The method may include identifying, at a compiler on a computer device, at least one hot spot with high register pressure in a program source code for an application. The method may include identifying a plurality of live variables within the at least one hot spot. The method may include grouping the plurality of live variables by a basic block that contains a define or single use of the plurality of live variables. The method may include for each basic block that has a grouped plurality of live variables, building a directed acyclic graph (DAG) for the grouped plurality of live variables. The method may include saving the DAG as a candidate instruction to move in the program source code. The method may include generating transformed program source code for the application by moving the candidate instruction in response to a total savings of the candidate instruction reaching a target register pressure for the program source code.

Another example implementation relates to a computer-readable medium storing instructions executable by a computer device. The computer-readable medium may include at least one instruction for causing the computer device to identify at least one hot spot with high register pressure in a program source code for an application. The computer-readable medium may include at least one instruction for causing the computer device to identify a plurality of live variables within the at least one hot spot. The computer-readable medium may include at least one instruction for causing the computer device to group the plurality of live variables by a basic block that contains a define or single use of the plurality of live variables. The computer-readable medium may include at least one instruction for causing the computer device to for each basic block that has a grouped plurality of live variables, build a directed acyclic graph (DAG) for the grouped plurality of live variables. The computer-readable medium may include at least one instruction for causing the computer device to save the DAG as a candidate instruction to move in the program source code. The computer-readable medium may include at least one instruction for causing the computer device to generate transformed program source code for the application by moving the candidate instruction in response to a total savings of the candidate instruction reaching a target register pressure for the program source code.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 3 illustrates an example of identifying candidate instructions to move across a hot spot in accordance with an implementation of the present disclosure.

DETAILED DESCRIPTION

Figure 1:
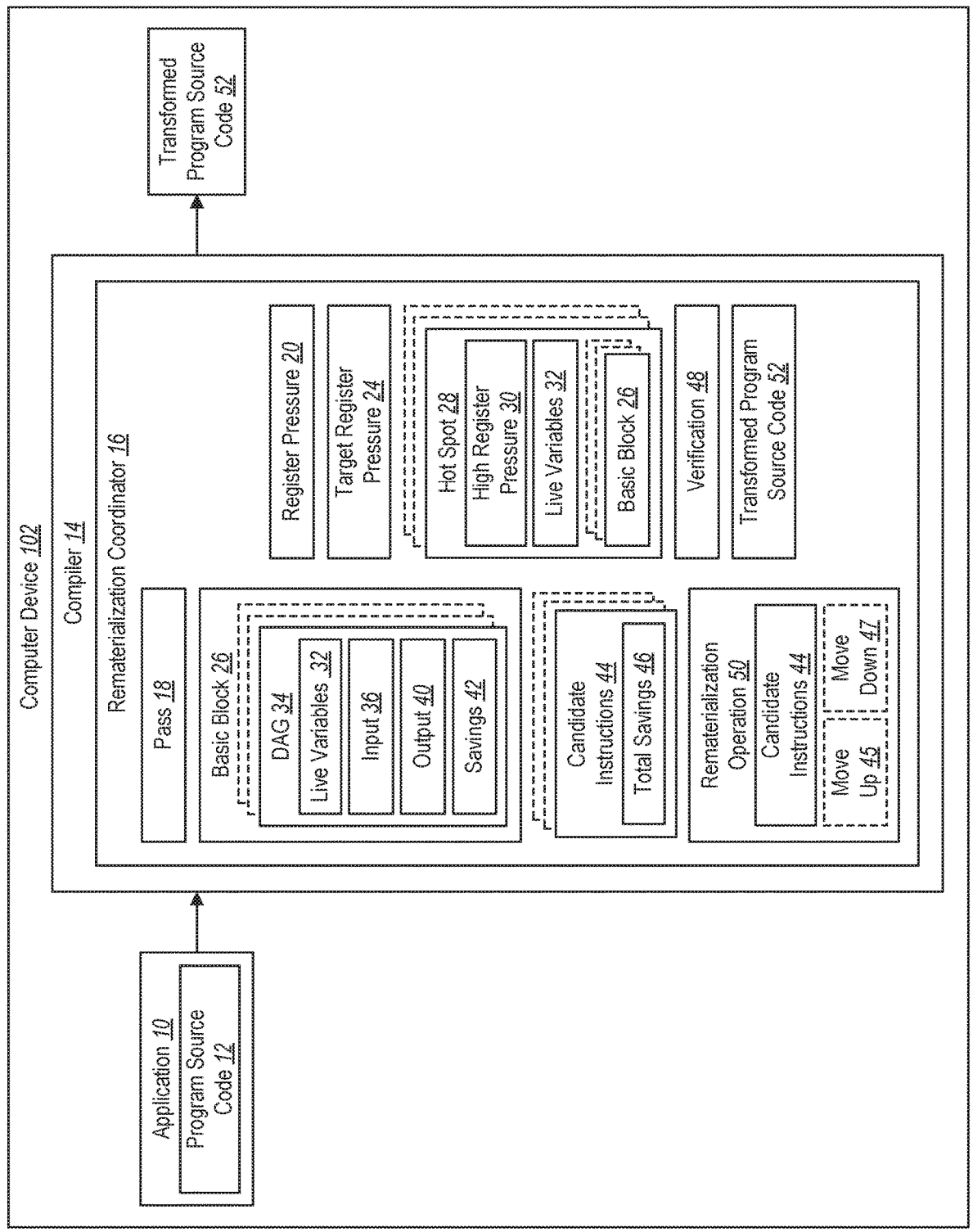
FIG. 1 is a schematic diagram of an example computer device in accordance with an implementation of the present disclosure.

This disclosure generally relates to transforming program source code using a rematerialization operation. The devices and methods may use a compiler to perform a rematerialization operation on the program source code to balance register pressure and instruction latency in the program source code. Register pressure may include the number of simultaneously live variables at an instruction within the program source code.

The balance between register pressure and instruction latency may be key to shader performance in graphic processing. Rematerialization may be used to balance cross basic block register pressure before instruction scheduling by moving instructions cross basic blocks in the program code, and thus, resulting in instruction scheduling achieving better results. Basic blocks may include a straight-line code sequence without branches into the basic blocks, except to the entry of the code sequence, and without branches out of the basic blocks, except at the exit of the code sequence. However, identifying candidate instructions that are safe to move across basic blocks to help improve register pressure may be difficult.

The present disclosure includes several practical applications that provide benefits and/or solve problems associated with improving program source code for an application. The devices and methods may use a compiler to scan the program source code to identify hot spots in the program source code that may have high register pressure. High register pressure may include areas in the program source code where the register pressure exceeds a target register pressure.

The devices and methods may identify live variables across the hot spots and may group the live variables by the basic blocks that define the live variables. For each basic block that has defined live variables, the devices and methods may iterate the different groups of registers within each basic block and may build one or more sub expression DAGs for the groups. The DAGs may be built by starting at the live variables at the bottom of the control flows at the registers and moving up the control flows until reaching an instruction or live variable that is unsafe to move. Upon reaching an instruction or live variable that is unsafe to move, the DAGs may end.

The devices and methods may save the DAGs as possible candidate instructions to move up or down in the program source code during a rematerialization operation. The devices and methods may perform a check or verification to ensure that a total savings of the possible candidate instructions may reduce the current register pressure to a target register pressure.

The devices and methods may perform a rematerialization operation on the candidate instructions when the target register pressure may be achieved. The rematerialization operation may move up or may move down the candidate instructions in the program source code resulting in a reduction in the number of registers used to process the candidate instructions. The rematerialization operation may generate transformed program source code with a new location for the candidate instructions moved during the rematerialization operation.

The devices and methods may be used in a case where a big number of values are generated from a small number of input values and used in other basic blocks to help reduce or otherwise minimize register pressure for the program source code.

As such, the devices and methods may be used to identify one or more candidate instructions for a rematerialization operation and may use the rematerialization operation to generate transformed program source code. The transformed program source code may reduce the number of registers used to process the control flows, and thus, may be used to improve the register pressure of the application. In addition, the devices and methods may be used to improve processing performance by reducing the register pressure in the transformed program source code. One example may include improving graphics processing by a graphics processing unit (GPU) shader by reducing the register pressure in the transformed program source code. Another example may include improving processing by a central processing unit (CPU) by reducing the register pressure in program source code for CPU applications. The methods and devices may also allow application developers to reach a performance target for an application. As such, the devices and methods may be used to improve processing in applications by reducing the number of registers used in processing the program source code.

Referring now to FIG. 1, illustrated is an example computer device 102 for use with rematerialization of program source code 12 for an application 10. Computer device 102 may include a plurality of applications 10 (up to n applications, where n is an integer). Computer device 102 may include a compiler 14 that receives the program source code 12. Compiler 14 may identify one or more candidate instructions 44 in the program source code 12 for a rematerialization operation 50. The rematerialization operation 50 may move the identified candidate instructions 44 in the program source code 12 to reduce the number of registers for processing the identified candidate instructions 44. The rematerialization operation 50 may generate transformed program source code 52 with a new location for the candidate instructions 44 moved during the rematerialization operation 50. Compiler 14 may output the transformed program source code 52 to use with application 10. Compiler 14 may be any compiler that may reduce the number of registers used for processing the program source code 12. In an implementation, compiler 14 may be a graphics compiler. In another implementation, compiler 14 may be a shader compiler.

Computer device 102 may include any mobile or fixed computer device, which may be connectable to a network. Computer device 102 may include, for example, a mobile device, such as, a mobile telephone, a smart phone, a personal digital assistant (PDA), a tablet, or a laptop. Additionally, or alternatively, computer device 102 may include one or more non-mobile devices such as a desktop computer, server device, or other non-portable devices. Additionally, or alternatively, computer device 102 may include a gaming device, a mixed reality or virtual reality device, a music device, a television, a navigation system, or a camera, or any other device having wired and/or wireless connection capability with one or more other devices. Computer device 102 may include features and functionality described below in connection with FIG. 5.

In addition, the components of compiler 14 may include hardware, software, or both. For example, the components of compiler 14 may include one or more instructions stored on a computer-readable storage medium and executable by processors of one or more computing devices. When executed by the one or more processors, the computer-executable instructions of one or more computing devices (e.g., compiler 14) can perform one or more methods described herein. Alternatively, the components of compiler 14 may include hardware, such as a special purpose processing device to perform a certain function or group of functions. Additionally, or alternatively, the components of compiler 14 may include a combination of computer-executable instructions and hardware.

Compiler 14 may include a rematerialization coordinator 16 that may perform a plurality of passes 18 on program source code 12 to identify one or more hot spots 28 in program source code 12. Hot spots 28 may include, but are not limited to, portions of program source code 12 that have high register pressure 30. High register pressure 30 may include areas in program source code 12 where the register pressure 20 is greater than a target register pressure 24. A target register pressure 24 may include the number of registers used for processing the control flows that results in good performance, such as, but not limited to, the program source code 12 running faster. One example target register pressure 24 for a CPU may include 64 registers. Another example target register pressure 24 for a CPU may include 84 registers. The target register pressure 24 may be variable. As such, whether program source code 12 has high register pressure 30 may change based on changes to the target register pressure 24. The target register pressure 24 may be the same for different applications 10. In addition, or alternatively, different applications 10 may have different target register pressures 24. Moreover, applications 10 may have a plurality of target register pressures 24.

One example use case of a program source code 12 having a plurality of a target register pressures 24 for a GPU that has 128 registers may include:

if (register pressure>64)
may allow program running 1 thread at same time
else if (register pressure>40)
may allow program running 2 threads at same time
else if (register pressure>32)
may allow program running 3 threads at same time
else if (register pressure>24)
may allow program running 4 threads at same time else
may allow program running 5 threads at same time.

In the above example, program source code 12 may have five different target register pressures 24 (e.g., 64 registers, 40 registers, 32 registers, 24 registers, and less than 24 registers). In addition, each target register pressure 24 may allow a different number of program threads to run at the same time. For example, the target register pressure 24 of 64 registers may allow 1 thread to run at the same time. The target register pressure 24 of 40 registers may allow 2 threads to run at the same time. The target register pressure 24 of 32 registers may allow 3 threads to run at the same time. The target register pressure 24 of 24 registers may allow 4 registers to run at the same time. The target register pressure 24 of less than 24 registers may allow 5 registers to run at the same time.

More threads running simultaneously may make the program source code 12 run faster. As such, a lower register pressure that allows more threads to run at the same time may be more beneficial relative to a higher register pressure that allows less threads to run at the same time.

One implementation for identifying which target register pressure 24 to use for the register pressure 20 may include identifying a nearest target register pressure 24 that may allow more threads to run. In the example use case above, before a rematerialization operation 50, if the register pressure 20 is 35 registers, rematerialization coordinator 16 may identify the nearest target register pressure 24 as 32 registers. The rematerialization operation 50 may help the register pressure to decrease below 32 registers so that 4 threads may be run at the same time, instead of 3 threads, and thus, increasing the speed of the transformed program source code 52 relative to the original program source code 12.

Rematerialization coordinator 16 may compare a register pressure 20 of program source code 12 at a boundary between two basic blocks 26 to a target register pressure 24. When the register pressure 20 exceeds a target register pressure 24, rematerialization coordinator 16 may identify the boundary between the two basic blocks 26 as a hot spot 28 with high register pressure 30. For example, if the target register pressure 24 is 64 registers and the register pressure 20 at a boundary of two basic blocks 26 is 70 registers, a hot spot 28 may be identified at the boundary of two basic blocks 26 having high register pressure 30. When the register pressure 20 is below a target register pressure 24 or equal to a target register pressure 24 at a boundary between two basic blocks 26, rematerialization coordinator 16 may move to a next basic block 26 in program source code 12 to compare the register pressure 20 of the next basic block 26 to the target register pressure 24.

Rematerialization coordinator 16 may scan every basic block 26 in program source code 12 to identify one or more hot spots 28 in program source code 12. For each hot spot 28 in program source code 12, rematerialization coordinator 16 may identify one or more live variables 32. Live variables 32 may include variables that are used in the control flows of the hot spots 28. Rematerialization coordinator 16 may group the live variables 32 by the basic blocks 26 that define the live variables 32.

Within each basic block 26 used to group the live variables 32 there may be different groups of registers at the point with high register pressure 30 that use the live variables 32. Rematerialization coordinator 16 may iterate the different groups of registers within each basic block 26 and build one or more DAGs 34 for the groups. For example, rematerialization coordinator 16 may start from the live variables 32 at the bottom of the control flow at the registers and move up the control flow until reaching an instruction or live variable 32 that is unsafe to move. Live variables 32 that are unsafe to move may include, but are not limited to, variables used by other instructions, variables that have multiple defines, and/or variables that may have a side-effect, such as, an atomic operation with a return value. Upon reaching an instruction or live variable 32 that is unsafe to move, rematerialization coordinator 16 may stop or end the DAG 34. As such, each DAG 34 within basic block 26 may have a plurality of live variables 32 that may be safe to move.

Rematerialization coordinator 16 may calculate an input 36 and output 40 for each DAG 34. The input 36 may identify the number of variables at the start of, or before, the control flows within each basic block 26. The output 40 may identify the number of variables at the end of the control flows within each basic block 26. By knowing the number of variables at the start and the end of the control flows, the number of registers may be determined for the input 36 and the output 40 of each basic block 26.

In addition, rematerialization coordinator 16 may calculate a savings 42 for each DAG 34. The savings 42 may be a difference between the output 40 and the input 36 of control flows. If the input 36 is less than the output 40, rematerialization coordinator 16 may save each DAG 34 as candidate instructions 44 to possibly move down 47 during a rematerialization operation 50 on the program source code 12.

If the input 36 is greater than the output 40, rematerialization coordinator 16 may group the live variables 32 that have only one use and that failed to make candidate instructions 44 to possibly move down 47 by the basic blocks 26 that contains the one use. For each basic block 26 that has grouped live variables 32, rematerialization coordinator 16 may build one or more DAGs 34 for the groups of live variables 32. Rematerialization coordinator 16 may start from the live variables 32 at the top of the control flow for the group and may move down the control flow until reaching an instruction or live variable 32 that is unsafe to move. Upon reaching an instruction or live variable 32 that is unsafe to move, rematerialization coordinator 16 may stop or end the DAG 34 for the group.

Rematerialization coordinator 16 may calculate an input 36 and output 40 for each DAG 34. The input 36 may identify the number of variables at the start of, or before, the control flow. The output 40 may identify the number of variables at the end of the control flow. In addition, rematerialization coordinator 16 may calculate a savings 42 for each DAG 34. The savings 42 may be the difference between the input 36 and the output 40. If the input 36 is greater than the output 40, rematerialization coordinator 16 may save the DAG 34 as candidate instructions 44 to possibly move up 45 during a rematerialization operation 50 on the program source code 12.

Rematerialization coordinator 16 may calculate a total savings 46 of the candidate instructions 44 by adding the savings 42 of each DAG 34 saved as a candidate instruction 44.

Rematerialization coordinator 16 may use the total savings 42 to perform a check or verification 48 on the candidate instructions 44. The verification 48 may ensure that the target register pressure 24 may be achieved with the total savings 42. If the target register pressure 24 may be achieved with the total savings 42, the rematerialization operation 50 may proceed with moving the candidate instructions 44.

One example use case may include the target register pressure 24 is 64 registers, the current register pressure 20 is 70 registers, and the total savings 46 for the candidate instructions 44 is 6 registers. The total savings 46 may decrease the current register pressure 20 to 64 registers, which is equal to the target register pressure 24 in this example use case. As such, the verification 48 may determine that the target register pressure 24 is achieved. Rematerialization coordinator 16 may use the output from the verification 48 to proceed with the rematerialization operation 50 on the program source code 12.

The rematerialization operation 50 may move up 45 and/or may move down 47 the candidate instructions 44. For example, the rematerialization operation 50 may move the candidate instructions 44 to the basic block 26 where the output of the candidate instructions 44 is used so that basic blocks 26 may be crossed by small input instead of large outputs. Another example may include the rematerialization operation 50 may move the candidate instructions 44 up the basic block 26 where the input is defined. Rematerialization coordinator 16 may generate transformed program source code 52 with the modified candidate instructions 44 to reduce the number of registers used to process the control flows of the transformed program source code 52.

However, if the target register pressure 24 is unable to be achieved with the total savings 42, verification 48 may prevent the rematerialization operation 50 from occurring on the program source code 12. By moving the candidate instructions 44 up and/or down within the program source code 12, additional instructions may be added at runtime. As such, a processing cost for moving the candidate instructions 44 may be beneficial if the target register pressure 24 may be achieved.

Another example use case may include the target register pressure 24 is 64 registers, the current register pressure 20 is 70 registers, and the total savings 46 for the candidate instructions 44 is 5 registers. The total savings 46 may decrease the current register pressure 20 to 65 registers, which is greater than the target register pressure 24 in this example use case. As such, the verification 48 may determine that the target register pressure 24 is unable to be reached with the total savings 46 of 5 registers. Rematerialization coordinator 16 may use the output from the verification 48 to stop or otherwise prevent the rematerialization operation 50 on the program source code 12.

Compiler 14 may output the transformed program source code 52 for use with application 10. The transformed program source code 52 may improve processing performance. For example, the transformed program source code 52 may improve graphics processing by a GPU shader by reducing the register pressure in the transformed program source code 52. By reducing the number of registers and increasing the number of threads running at the same time, the transformed program source code 52 may run faster than the original program source code 12. In addition, the transformed program source code 52 may allow application developers to reach a performance target for application 10. As such, compiler 14 may be used to improve processing in applications 10 by reducing the number of registers used in processing the program source code 12.

Figure 2A:
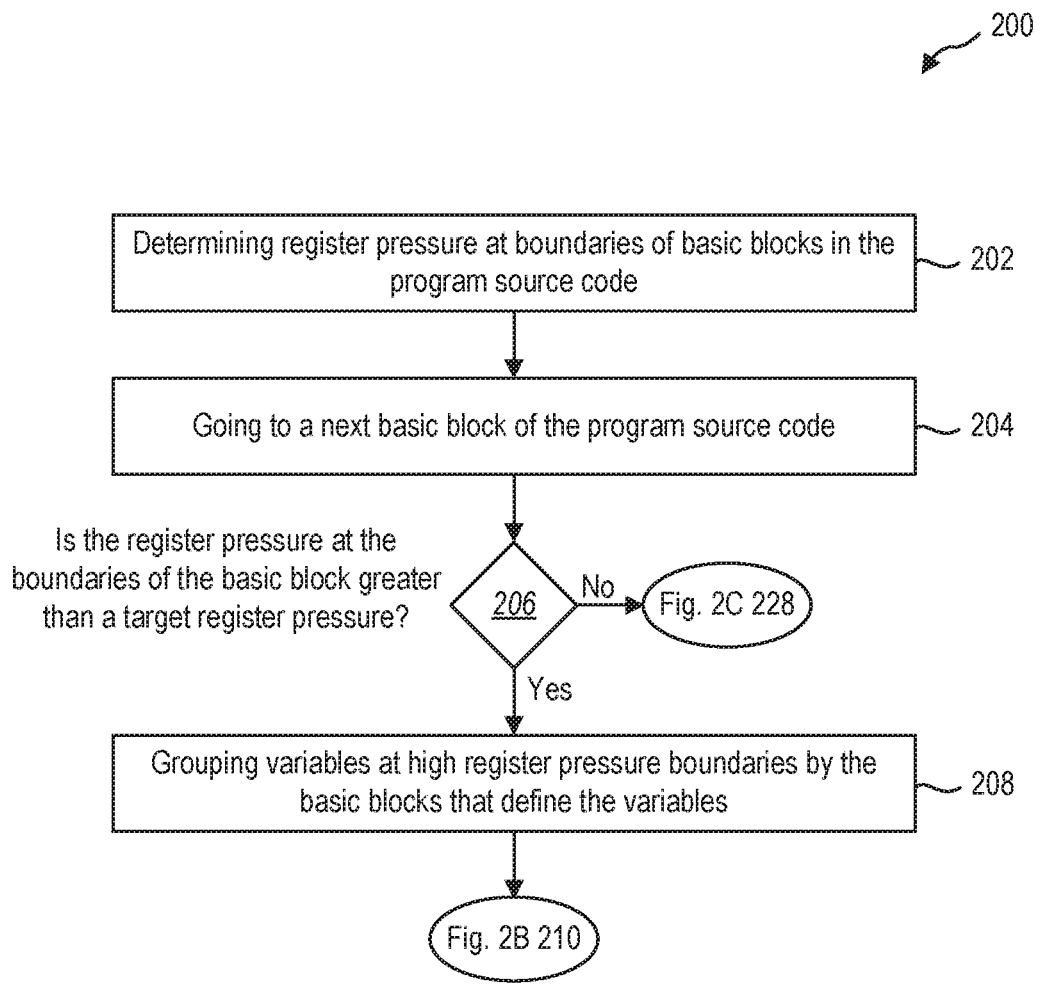
FIGS. 2A, 2B, and 2C illustrate an example method flow for a rematerialization operation on program source code for an application in accordance with an implementation of the present disclosure.
Figure 2B:
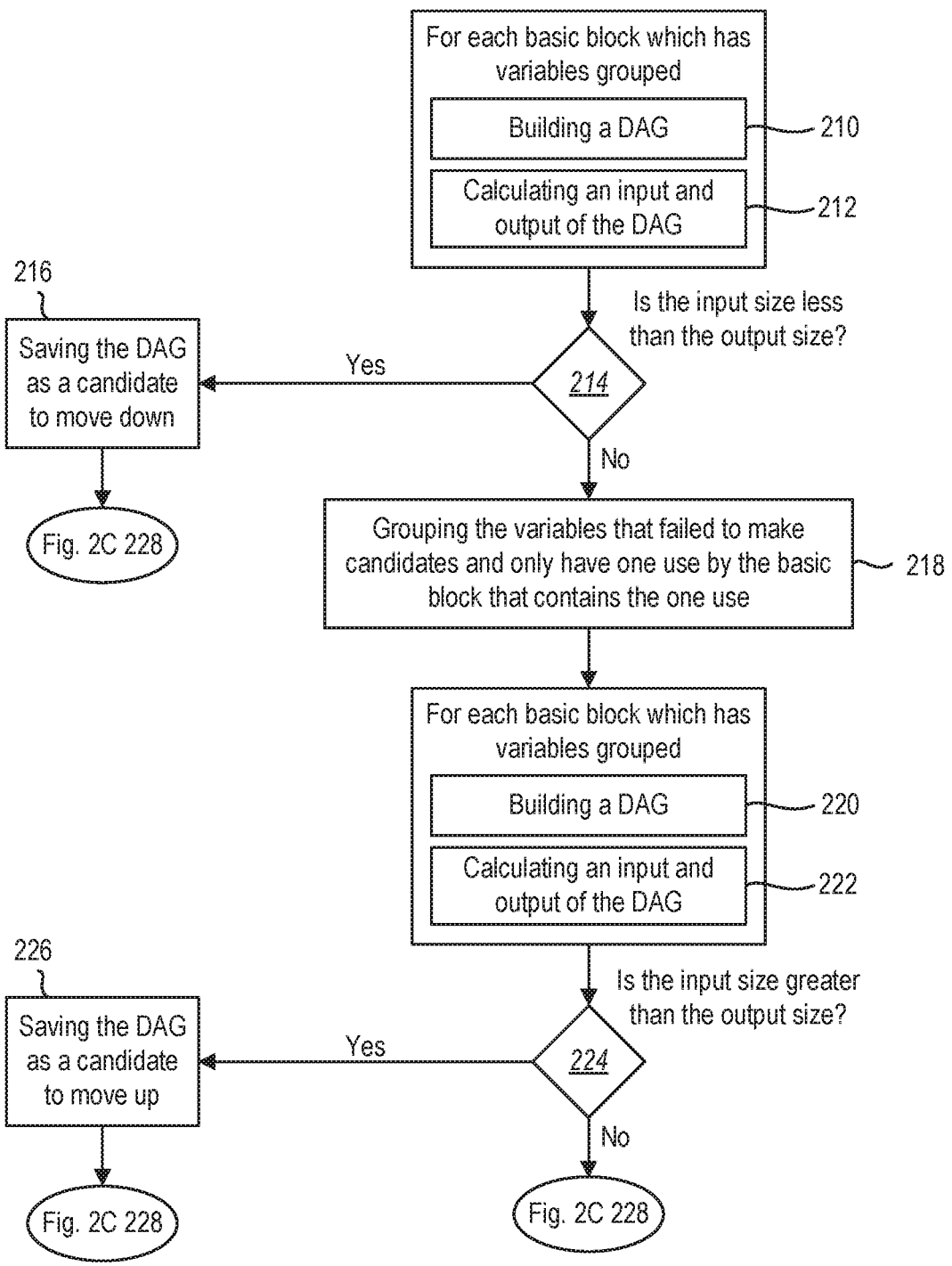
Figure 2C:
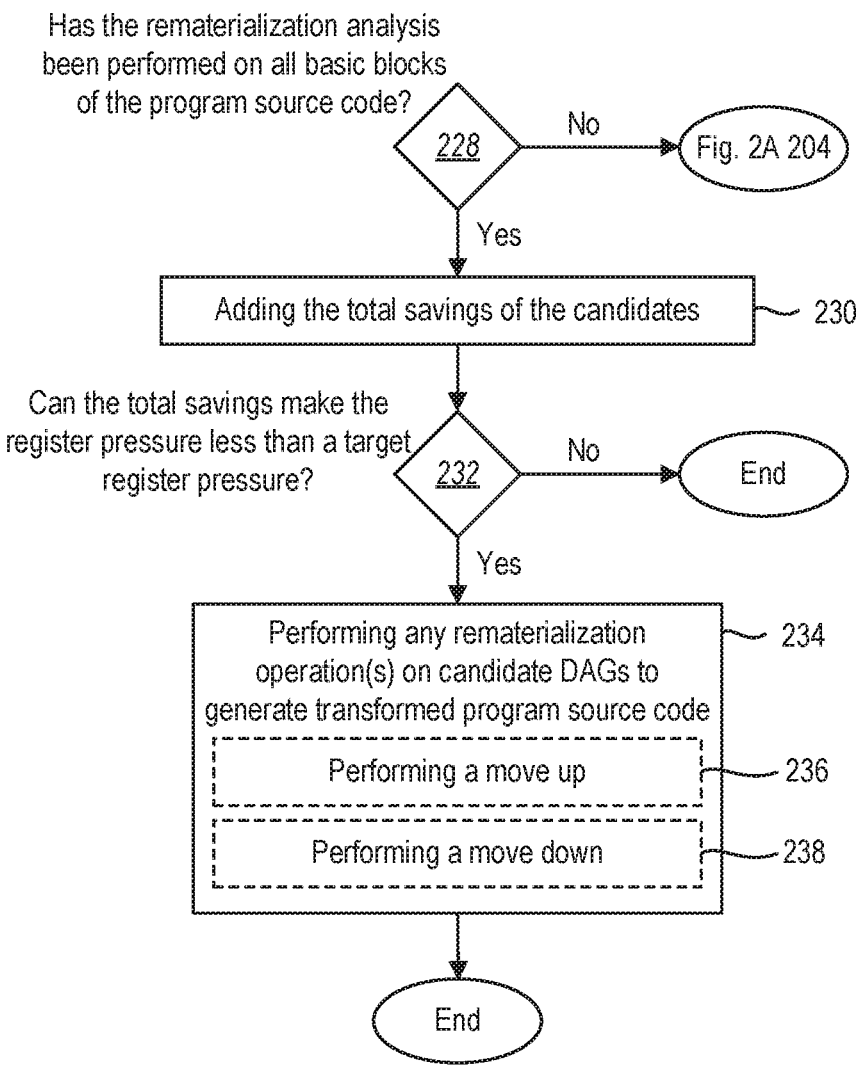

Referring now to FIGS. 2A, 2B, and 2C, an example method flow 200 may be used by computer device 102 (FIG. 1) for performing a rematerialization operation on program source code 12 (FIG. 1) for application 10 (FIG. 1) and generating transformed program source code 52 (FIG. 1). The actions of method 200 may be discussed below with reference to the architecture of FIG. 1.

At 202, method 200 may include determining register pressure of basic blocks in the program source code. Compiler 14 may include a rematerialization coordinator 16 that may perform a plurality of passes 18 on program source code 12 for application 10 to identify the register pressure 20 of the program source code 12. The register pressure 20 may include a total number of registers used by the basic blocks 26 for the variables needed to perform one or more control flows within the basic blocks 26. Basic blocks 26 may include a straight-line code sequence without branches into the basic block 26, except to the entry of the code sequence, and without branches out of the basic block 26, except at the exit of the code sequence.

At 204, method 200 may include going to a next basic block of the program source code. Rematerialization coordinator 16 may ensure that all basic blocks 26 in the program source code 12 are scanned in determining the register pressure 20 for the basic blocks 26.

At 206, method 200 may include determining whether the register pressure at the boundaries of the basic blocks is greater than a target register pressure. Rematerialization coordinator 16 may compare the register pressure 20 at the boundaries of the basic blocks 26 to a target register pressure 24 for the program source code 12. A target register pressure 24 may include the number of registers used for processing control flows that results in good performance. Good performance may include, but is not limited to, the program source code 12 running faster. One example target register pressure 24 for a GPU may include 64 registers. Another example target register pressure 24 for a GPU may include 84 registers. The target register pressure 24 may be variable. As such, whether program source code 12 has high register pressure 30 may change based on changes to the target register pressure 24.

Rematerialization coordinator 16 may identify one or more hot spots 28 in program source code 12 that have high register pressure 30. For example, high register pressure 30 may be determined at a boundary between two basic blocks 26 of program source code 12 when the register pressure 20 exceeds a target register pressure 24.

One example use case may include a target register pressure 24 for program source code 12 of 64 registers. Rematerialization coordinator 16 may determine a register pressure 20 of 70 registers for a boundary of basic blocks 26. Rematerialization coordinator 16 may determine that the register pressure 20 of 70 registers exceeds the target register pressure 24 of 64 registers and may identify the boundary of basic blocks 26 as a hot spot 28 with high register pressure 30.

If the register pressure 20 at the boundaries of basic blocks 26 is equal to or less than the target register pressure 24 at the boundary of the basic blocks 26, method 200 may proceed to 228 (FIG. 2C).

If the register pressure 20 at the boundaries of basic blocks 26 exceeds the target register pressure 24, at 208, method 200 may include grouping the variables at high register pressure boundaries by the basic blocks that define the variables or a single use of the variable. For each hot spot 28 in program source code 12, rematerialization coordinator 16 may identify one or more live variables 32. Live variables 32 may include variables that are used in the control flows of the hot spots 28. Rematerialization coordinator 16 may group the live variables 32 by the basic blocks 26 that define the live variables 32 or a single use of the live variables 32.

At 210, method 200 may include building a DAG for each basic block which has variables grouped. Rematerialization coordinator 16 may build one or more DAGs 34 for each basic block which has live variables 32 grouped.

Within each basic block 26 used to group the live variables 32 there may be different groups of registers at the point with high register pressure 30 that use the live variables 32. Rematerialization coordinator 16 may iterate the different groups of registers within each basic block 26 and build one or more DAGs 34 for the groups. For example, rematerialization coordinator 16 may start from the live variables 32 at the bottom of a control flow at the registers and move up the control flow until reaching an instruction or live variable 32 that is unsafe to move. Live variables 32 that are unsafe to move may include, but are not limited to, variables used by other instructions, variables that have multiple defines, and/or variables that may have a side-effect, such as, an atomic operation with a return value. Upon reaching an instruction or live variable 32 that is unsafe to move, rematerialization coordinator 16 may stop or end the DAGs 34. As such, each DAGs 34 within basic block 26 may have a plurality of live variables 32 that may be safe to move.

At 212, method 200 may include calculating an input and an output of the DAG for each basic block which has variables grouped. Rematerialization coordinator 16 may calculate an input 36 and output 40 for each DAG 34 of each basic block 26 that has live variables 32 grouped.

The input 36 may identify the number of variables at the start of, or before, the control flows within each basic block 26. The output 40 may identify the number of variables at the end of the control flows within each basic block 26. By knowing the number of variables at the start and the end of the control flows, the number of registers may be determined for the input 36 and the output 40 of each basic block 26.

At 214, method 200 may include determining whether the input size is less than the output size. Rematerialization coordinator 16 may compare the input 36 of the control flows to the output 40 of the control flows for each basic block 26. For example, rematerialization coordinator 16 may calculate a savings 42 for each DAG 34. The savings 42 may be a difference between the output 40 and the input 36 of the control flows.

At 216, method 200 may include saving the DAG as a candidate to move down when the input size is less than the output size. For each DAG where the input 36 is less than the output 40, rematerialization coordinator 16 may save the DAG 34 as candidate instructions 44 to possibly move down 47 during a rematerialization operation 50 on the program source code 12. Method 200 may proceed to 228 (FIG. 2C).

If the input size is greater than the output size, at 218, method 200 may include grouping the variables that failed to make candidates and only have one use by the basic block that contains the one use. If the input 36 is greater than the output 40, rematerialization coordinator 16 may group the live variables 32 that have only one use and that failed to make candidate instructions 44 to possibly move down 47 by the basic blocks 26 that contains the one use.

At 220, method 200 may include building a DAG for each basic block which has variables grouped. For each basic block 26 that has grouped live variables 32, rematerialization coordinator 16 may build one or more DAGs 34 for the groups of live variables 32. Rematerialization coordinator 16 may start from the live variables 32 at the top of the control flow for the group and may move down the control flow until reaching an instruction or live variable 32 that is unsafe to move. Upon reaching an instruction or live variable 32 that is unsafe to move, rematerialization coordinator 16 may stop or end the DAGs 34 for the group.

At 222, method 200 may include calculating an input and output of the DAG for each basic block that has variables grouped. Rematerialization coordinator 16 may calculate an input 36 and output 40 for each DAG 34. The input 36 may identify the number of variables at the start of, or before, the control flows of the basic blocks 26. The output 40 may identify the number of variables at the end of the control flows of the basic blocks 26.

At 224, method 200 may include determining whether the input size is greater than the output size. Rematerialization coordinator 16 may compare the input 36 of the control flows to the output 40 of the control flows for each basic block 26. For example, rematerialization coordinator 16 may calculate a savings 42 for each DAG 34. The savings 42 may be the difference between the input 36 and the output 40.

At 226, method 200 may include saving the DAG as a candidate to move up if the input size is greater than the output size. If the input 36 is greater than the output 40, rematerialization coordinator 16 may save the DAG 34 as candidate instructions 44 to possibly move up 45 during a rematerialization operation 50 on the program source code 12. If the input size is less than the output size, the method may proceed to 228 (FIG. 2C).

At 228, method 200 may include determining whether the rematerialization analysis has been performed on all basic blocks of the program source code. Rematerialization coordinator 16 may determine whether all basic blocks 26 of the program source code 12 have been analyzed. If the analysis skipped any basic blocks 26, method 200 may return to 204 (FIG. 2A).

If the analysis has been performed on all the basic blocks of the program source code, at 230, method 200 may include adding the total savings of the candidates. Rematerialization coordinator 16 may calculate a total savings 46 of the candidate instructions 44 by adding the savings 42 of each DAG 34 saved as a candidate instruction 44 (e.g., any candidate instructions saved to move up and any candidate instructions saved to move down).

At 232, method 200 may include determining whether the total register pressure can make the register pressure achieve the target register pressure. Rematerialization coordinator 16 may use the total savings 42 to perform a verification 48 on the candidate instructions 44. The verification 48 may ensure that the target register pressure 24 may be achieved with the total savings 42.

If the target register pressure 24 is unable to be achieved with the total savings 42, verification 48 may prevent the rematerialization operation 50 from occurring on the program source code 12 and method 200 may end. By moving the candidate instructions 44 up and/or down within the program source code 12, additional instructions may be added at runtime. As such, a processing cost for moving the candidate instructions 44 may only be beneficial upon reaching the target register pressure 24.

One example use case may include the target register pressure 24 is 84 registers, the current register pressure 20 is 86 registers, and the total savings 46 for the candidate instructions 44 is 4 registers. The total savings 46 may decrease the current register pressure 20 to 82 registers, which is less than the target register pressure 24 in this example use case. As such, the verification 48 may determine that the target register pressure 24 is achieved. Rematerialization coordinator 16 may use the output from the verification 48 to proceed with the rematerialization operation 50 on the program source code 12.

At 234, method 200 may include performing any rematerialization operations on candidate DAGs to generate transformed program source code if the target register pressure can be achieved with the total savings. If the target register pressure 24 may be achieved with the total savings 42, the rematerialization operation 50 may proceed with moving the candidate instructions 44.

At 236, method 200 may optionally include performing a move up operation on the candidate instructions. The rematerialization operation 50 may move up all the candidate instructions 44 saved as candidate instructions to move up. The rematerialization operation 50 may move the candidate instructions 44 up the basic block 26 where the input is defined. For example, if a variable is not defined by instructions included in the DAG 34 for candidate instructions 44, but the variable is used by the instructions included in the DAG 34 for candidate instructions 44, the variable is input to the candidate instructions 44. In an implementation, the rematerialization operation 50 may move a subset of the candidate instruction saved as candidates instructions to move up.

At 238, method 200 may optionally include performing a move down operation on the candidate instructions. The rematerialization operation 50 may move the candidate instructions 44 to the basic block 26 where the output of the control flow is used so that basic blocks 26 may be crossed by small input instead of large outputs. For example, if a variable is defined by instructions included in the DAG 34 for candidate instructions 44 and used by instructions not included in the DAG 34 for candidate instructions 44, then the variable is an output of candidate instructions 44. In an implementation, the rematerialization operation 50 may move a subset of the candidate instruction saved as candidates instructions to move up.

Method 200 may be used to perform a rematerialization analysis on the program source code 12 to identify one or more candidate instructions 44 for a rematerialization operation 50. The rematerialization operation may generate transformed program source code 52 with the modified candidate instructions 44 to reduce the number of registers used to process the control flows of the transformed program source code 52. As such, the transformed program source code 52 may be used to improve register pressure in application 10.

Referring now to FIG. 3, illustrated is an example graphical user interface 300 displaying example application program source code 12 (FIG. 1) for an application 10 (FIG. 1) and an example graphical user interface 308 displaying example transformed program source code 52 (FIG. 1) for application 10 in accordance with an implementation of the present disclosure.

In this example, a hot spot 28 (FIG. 1) may be identified in application program source code 12 where register pressure is high. For example, rematerialization coordinator 16 (FIG. 1) may perform one or more passes 18 on application program source code 12 to identify a hot spot 28 for control flow 304 where the register pressure may be greater than a target register pressure for application program source code 12. The example hot spot 28 for control flow 304 may include several calculations performed inside the if statement that causes the register pressure for hot spot 28 to be greater than a target register pressure for application program source code 12.

Above the example hot spot 28, an example function 302 may define a plurality of variables "c," "d," "e," and "f". Below the example hot spot 28, an expression 306 may use the plurality of variables "c," "d," "e," and "f". As such, the plurality of variables "c," "d," "e," and "f" may be live variables 32 that live across hot spot 28 because they are defined before hot spot 28 and used after hot spot 28.

Rematerialization coordinator 16 may determine that variables "c," "d," "e," and "f" are not used within hot spot 28, and thus, may determine that variables "c," "d," "e," and "f" may be safe to move down below hot spot 28. Rematerialization coordinator may perform a rematerialization operation 50 (FIG. 1) on the application program source code 12 moving variables "c," "d," "e," and "f" below control flow 304 and may generate transformed program source code 52 illustrated in user interface 308.

For example, transformed program source code 52 may have an example function 310 above the control flow 312. Example function 310 may correspond to the example function 302 in application program source code 12 illustrated in user interface 300. In addition, the control flow 312 may correspond to the control flow 304 in application program source code 12 illustrated in user interface 300.

In the transformed program source code 52, however, variables "c," "d," "e," and "f" are no longer defined in the example function 310 above the control flow 312. Instead, variables "c," "d," "e," and "f" have been moved below the control flow 312 and used in expression 314 after control flow 312. By moving variables "c," "d," "e," and "f" down in the transformed program source code 52 below control flow 312, a savings of 2 registers may occur at the identified hot spot 28 in application program source code 12.

Figure 4:
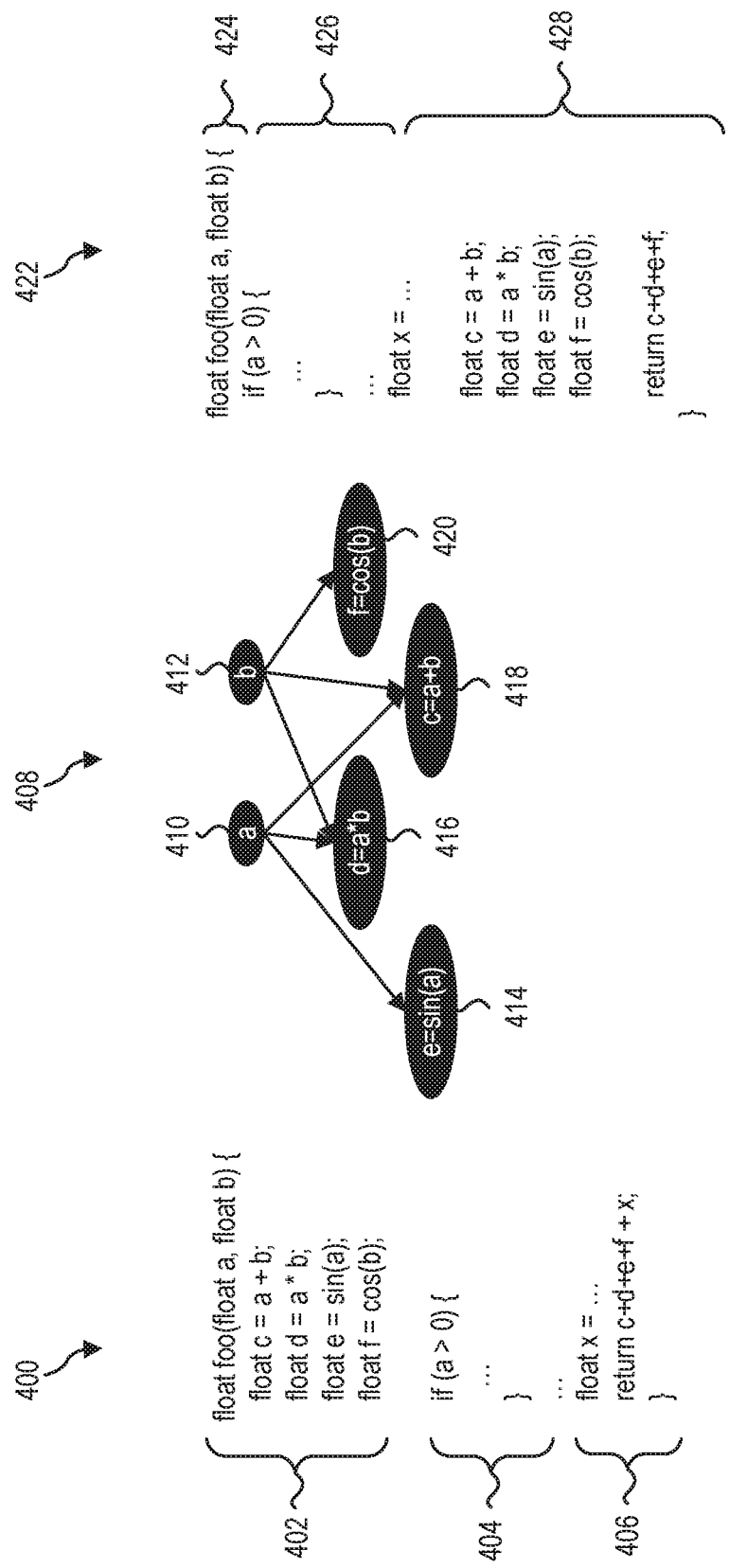
FIG. 4 illustrates an example of a Directed Acyclic Graph (DAG) for identified candidate instructions in accordance with an implementation of the present disclosure.

Referring now to FIG. 4, illustrated is an example graphical user interface 400 displaying example application program source code 12 (FIG. 1) for an application 10 (FIG. 1), an example graphical user interface 408 displaying an example DAG 34 (FIG. 1), and an example graphical user interface 422 displaying example transformed program source code 52 (FIG. 1) for application 10 in accordance with an implementation of the present disclosure.

In this example, a hot spot 28 (FIG. 1) may be identified in application program source code 12 where register pressure is high. For example, rematerialization coordinator 16 (FIG. 1) may perform one or more passes 18 on application program source code 12 to identify a hot spot 28 for control flow 404 where the register pressure may be greater than a target register pressure for application program source code 12. The example hot spot 28 for control flow 404 may include several calculations performed inside the if statement that causes the register pressure for hot spot 28 to be greater than a target register pressure for application program source code 12.

Above the example hot spot 28, an example function 402 may define a plurality of variables "c" 418, "d" 416, "e" 414, "f" 420. Below the example hot spot 28, an expression 406 that uses the plurality of variables "c" 418, "d" 416, "e" 414, "f" 420. As such, the plurality of variables "c" 418, "d" 416, "e" 414, "f" 420 may be live variables 32 that live across hot spot 28 because they are defined before hot spot 28 and used after hot spot 28. Moreover, the plurality of variables "c" 418, "d" 416, "e" 414, "f" 420 may be grouped together as output of an entry block for control flow 404.

Rematerialization coordinator 16 may generate a DAG 34 for the plurality of live variables "c" 418, "d" 416, "e" 414, "f" 420. Rematerialization coordinator 16 may build the DAG 34 from starting at "c" 418, "d" 416, "e" 414, "f" 420 and working upwards until reaching variables "a" 410 and "b" 412. When reaching variables "a" 410 and "b" 412, the DAG 34 may stop because variables "a" 410 and "b" 412 may be unsafe to move since variables "a" 410 and "b" 412 are the input variables.

Rematerialization coordinator 16 may use the DAG 34 to determine that variables "c" 418, "d" 416, "e" 414, "f" 420 may be safe to move down below hot spot 28. As such, rematerialization coordinator may perform a rematerialization operation 50 (FIG. 1) on the application program source code 12 moving variables "c" 418, "d" 416, "e" 414, "f" 420 below control flow 404 so that variables "c" 418, "d" 416, "e" 414, "f" 420 are not live when variable "x" is calculated, while keeping variables "a" 410 and "b" 412 at expression 402. The rematerialization operation 50 may generate transformed program source code 52 illustrated in user interface 422.

Transformed program source code 52 may have an example function 424 that corresponds to example function 402 in application program source code 12 above the control flow 426. Control flow 426 may correspond to the example control flow 404 in application program source code 12 illustrated in user interface 400. Function 424 may have variables "a" 410 and "b" 412 as input to the function 424.

In the transformed program source code 52, however, "c" 418, "d" 416, "e" 414, "f" 420 are no longer defined in the example function 424 above the control flow 426. Instead, variables "c" 418, "d" 416, "e" 414, "f" 420 have been moved below the control flow 426 and used in expression 428 after control flow 426. By moving variables "c" 418, "d" 416, "e" 414, "f" 420 down below control flow 426, a savings of 2 registers may occur at the identified hot spot 28 in application program source code 12. The savings of 2 registers may be calculated by the difference between the output of 4 (e.g., variables "c" 418, "d" 416, "e" 414, "f" 420) and the input of 2 (e.g., variables "a" 410 and "b" 412).

As such, transformed program source code 52 may be used to reduce the register pressure for application 10.

Figure 5:
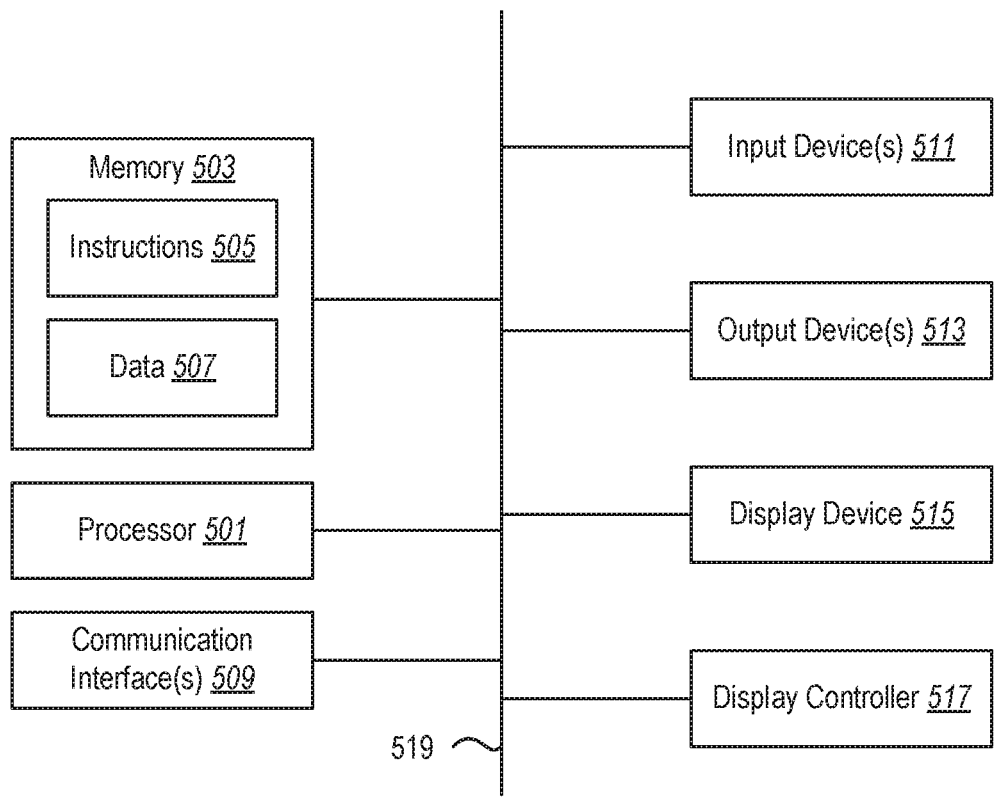
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method comprising:
    identifying, at a compiler on a computer device, at least one hot spot with high register pressure in a program source code for an application, wherein determining high register pressure of the program source code comprises, the compiler includes a rematerialization coordinator that perform a plurality of passes on the program source code for an application to identify the high register pressure;
    the high register pressure include a total number of registers used by basic blocks of the program source code for variables needed to perform one or more control flows within the basic blocks;
    basic blocks include a straight-line code sequence without branches into the basic block, except to the entry of the code sequence, and without branches out of the basic block, and except at the exit of the code sequence;
    identifying a plurality of live variables within the at least one hot spot;
    grouping the plurality of live variables by a basic block that contains a define or single use of the plurality of live variables;
    for each basic block that has a grouped plurality of live variables, building a directed acyclic graph (DAG) for the grouped plurality of live variables;
    saving the DAG as a candidate instruction to move in the program source code; and generating transformed program source code for the application by moving the candidate instruction in response to a total savings of the candidate instruction reaching a target register pressure for the program source code.

2. The method of claim 1, wherein building the DAG for the grouped plurality of live variables further includes starting the DAG at a bottom of a control flow and moving up the control flow until reaching an instruction that is unsafe to move.

3. The method of claim 1, further comprising:
calculating for the DAG an input of the DAG, wherein the input identifies a number of variables at a start of a control flow; and
calculating an output of the DAG, wherein the output identifies a number of variables at an end of the control flow.

4. The method of claim 3, further comprising:
saving the DAG as a candidate instruction to move down in the program source code when the input is less than the output.

5. The method of claim 4, further comprising:
grouping a subset of the plurality of live variables that have one use and failed to make the candidate instruction to move down by a basic block that contains the one use;
for each basic block that has a grouped subset of plurality of live variables and contains the one use, building the DAG for the grouped subset of plurality of live variables by starting at a top of a control flow for the grouped subset of plurality of live variables and moving down the control flow for the grouped subset of plurality of live variables until reaching an instruction that is unsafe to move;
calculating an input for the DAG, wherein the input identifies a number of variables at a start of the control flow; and
calculating an output for the DAG, wherein the output identifies a number of variables at an end of the control flow.

6. The method of claim 5, further comprising:
saving the DAG as a candidate instruction to move up in the program source code when the input is greater than the output.

7. The method of claim 1, wherein moving the candidate instruction further includes moving the candidate instruction up or moving the candidate instruction down in the program source code.

8. The method of claim 1, wherein the total savings of the candidate instruction is a number of registers reduced by moving the candidate instruction in the program source code.

9. The method of claim 1, wherein the high register pressure is greater than the target register pressure.

10. A computer device, comprising:
a memory to store data and instructions;
at least one processor operable to communicate with the memory; and
a compiler in communication with the memory and the at least one processor, wherein the compiler is operable to:
identify at least one hot spot with high register pressure in a program source code for an application, wherein determining high register pressure of the program source code comprises, the compiler includes a rematerialization coordinator that perform a plurality of passes on the program source code for an application to identify the high register pressure;
the high register pressure include a total number of registers used by basic blocks of the program source code for variables needed to perform one or more control flows within the basic blocks;
basic blocks include a straight-line code sequence without branches into the basic block, except to the entry of the code sequence, and without branches out of the basic block, and except at the exit of the code sequence;
identify a plurality of live variables within the at least one hot spot;
group the plurality of live variables by a basic block that contains a define or single use of the plurality of live variables;
for each basic block that has a grouped plurality of live variables, build a directed acyclic graph (DAG) for the grouped plurality of live variables;
save the DAG as a candidate instruction to move in the program source code; and
generate transformed program source code for the application by moving the candidate instruction in response to a total savings of the candidate instruction reaching a target register pressure for the program source code.

11. The computer device of claim 10, wherein the compiler is further operable to build the DAG for the grouped plurality of live variables by starting the DAG at a bottom of a control flow and moving up the control flow until reaching an instruction that is unsafe to move.

12. The computer device of claim 10, wherein the compiler is further operable to:
calculate for the DAG an input of the DAG, wherein the input identifies a number of variables at a start of a control flow; and
calculate an output of the DAG, wherein the output identifies a number of variables at an end of the control flow.

13. The computer device of claim 12, wherein the compiler is further operable to:
save the DAG as a candidate instruction to move down in the program source code when the input is less than the output.

14. The computer device of claim 13, wherein the compiler is further operable to:
group a subset of the plurality of live variables that have one use and failed to make the candidate instruction to move down by a basic block that contains the one use;
for each basic block that has a grouped subset of plurality of live variables and contains the one use, build the DAG for the grouped subset of plurality of live variables by starting at a top of a control flow for the grouped subset of plurality of live variables and moving down the control flow for the grouped subset of plurality of live variables until reaching an instruction that is unsafe to move;
calculate an input for the DAG, wherein the input identifies a number of variables at a start of the control flow; and
calculate an output for the DAG, wherein the output identifies a number of variables at an end of the control flow.

15. The computer device of claim 14, wherein the compiler is further operable to:
save the DAG as a candidate instruction to move up in the program source code when the input is greater than the output.

16. The computer device of claim 10, wherein the compiler is further operable to move the candidate instruction up or move the candidate instruction down in the program source code.

17. The computer device of claim 10, wherein the total savings of the candidate instruction is a number of registers reduced by moving the candidate instruction in the program source code.

18. The computer device of claim 10, wherein the high register pressure is greater than the target register pressure.

19. A non-transitory computer-readable medium storing instructions executable by a computer device, comprising:
- at least one instruction for causing the computer device to identify at least one hot spot with high register pressure in a program source code for an application, wherein determining high register pressure of the program source code comprises, the compiler includes a rematerialization coordinator that perform a plurality of passes on the program source code for an application to identify the high register pressure;
- the high register pressure include a total number of registers used by basic blocks of the program source code for variables needed to perform one or more control flows within the basic blocks; basic blocks include a straight-line code sequence without branches into the basic block, except to the entry of the code sequence, and without branches out of the basic block, and except at the exit of the code sequence; at least one instruction for causing the computer device to identify a plurality of live variables within the at least one hot spot;
- at least one instruction for causing the computer device to group the plurality of live variables by a basic block that contains a define or single use of the plurality of live variables;
- at least one instruction for causing the computer device to for each basic block that has a grouped plurality of live variables, build a directed acyclic graph (DAG) for the grouped plurality of live variables;
- at least one instruction for causing the computer device to save the DAG as a candidate instruction to move in the program source code; and
- at least one instruction for causing the computer device to generate transformed program source code for the application by moving the candidate instruction in response to a total savings of the candidate instruction reaching a target register pressure for the program source code.

* * * * *